(12) United States Patent
Daimo

(10) Patent No.: US 12,394,421 B2
(45) Date of Patent: Aug. 19, 2025

(54) SPEAKER IDENTIFICATION APPARATUS, SPEAKER IDENTIFICATION METHOD, AND RECORDING MEDIUM

(71) Applicant: Panasonic Intellectual Property Corporation of America, Torrance, CA (US)

(72) Inventor: Katsunori Daimo, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 295 days.

(21) Appl. No.: 17/883,972

(22) Filed: Aug. 9, 2022

(65) Prior Publication Data

US 2022/0383880 A1     Dec. 1, 2022

Related U.S. Application Data

(63) Continuation of application No. PCT/JP2021/004224, filed on Feb. 5, 2021.
(Continued)

(30) Foreign Application Priority Data

Aug. 31, 2020 (JP) ................................ 2020-146245

(51) Int. Cl.
G10L 17/06     (2013.01)
G10L 17/02     (2013.01)
G10L 25/63     (2013.01)

(52) U.S. Cl.
CPC .............. *G10L 17/06* (2013.01); *G10L 17/02* (2013.01); *G10L 25/63* (2013.01)

(58) Field of Classification Search
None
See application file for complete search history.

(56) References Cited

U.S. PATENT DOCUMENTS 10,943,604 B1 * 3/2021 Bone ........................ G10L 17/04
11,854,538 B1 * 12/2023 Rozgic ..................... G10L 25/63
(Continued)

FOREIGN PATENT DOCUMENTS

CN     110473571     11/2019
JP     10-247092     9/1998
(Continued)

OTHER PUBLICATIONS

International Search Report (ISR) issued on Mar. 30, 2021 in International (PCT) Application No. PCT/JP2021/004224.
(Continued)

*Primary Examiner* — Neeraj Sharma
(74) *Attorney, Agent, or Firm* — Wenderoth, Lind & Ponack, L.L.P.

(57) ABSTRACT

A speaker identification apparatus that identifies a speaker of utterance data indicating a voice of an utterance subjected to identification includes: an emotion estimator that estimates, from an acoustic feature value calculated from the utterance data, an emotion contained in the voice of the utterance indicated by the utterance data, using a trained deep neural network (DNN); and a speaker identification processor that outputs, based on the acoustic feature value calculated from the utterance data, a score for identifying the speaker of the utterance data, using an estimation result of the emotion estimator.

11 Claims, 12 Drawing Sheets

Related U.S. Application Data

(60) Provisional application No. 62/981,235, filed on Feb. 25, 2020.

(56) References Cited

U.S. PATENT DOCUMENTS

| | | | |
|---|---|---|---|
| 11,922,356 B1* | 3/2024 | Shaburov | H04N 21/440218 |
| 2003/0028384 A1* | 2/2003 | Kemp | G10L 17/26 |
| | | | 704/275 |
| 2003/0055654 A1* | 3/2003 | Oudeyer | G10L 13/033 |
| | | | 704/275 |
| 2003/0068063 A1 | 4/2003 | Usuki et al. | |
| 2008/0269958 A1* | 10/2008 | Filev | G06N 3/006 |
| | | | 701/1 |
| 2014/0067375 A1* | 3/2014 | Wooters | G06F 40/35 |
| | | | 704/9 |
| 2016/0217807 A1* | 7/2016 | Gainsboro | H04M 3/568 |
| 2018/0032610 A1* | 2/2018 | Cameron | G10L 15/18 |
| 2018/0308487 A1* | 10/2018 | Goel | G10L 15/1815 |
| 2019/0253558 A1* | 8/2019 | Haukioja | G10L 15/22 |
| 2019/0385597 A1* | 12/2019 | Katsamanis | G06Q 30/01 |
| 2020/0075040 A1* | 3/2020 | Provost | G06N 3/044 |
| 2021/0158813 A1* | 5/2021 | Sivasubramanian | |
| | | | G06Q 10/107 |
| 2022/0375469 A1* | 11/2022 | Yang | G10L 13/027 |

FOREIGN PATENT DOCUMENTS

| | | |
|---|---|---|
| JP | 2003-330492 | 11/2003 |
| JP | 2017-187642 | 10/2017 |
| JP | 2019-197550 | 11/2019 |
| JP | 2020-42292 | 3/2020 |

OTHER PUBLICATIONS

Ismail Shahin, "Identifying speakers using their emotion cues", International Journal of Speech Technology, vol. 14, No. 2, Jan. 2011, pp. 89-98.

Search Report issued May 29, 2025 in corresponding Chinese Patent Application No. 202180013727.1, with English-language Translation.

* cited by examiner

SPEAKER IDENTIFICATION APPARATUS, SPEAKER IDENTIFICATION METHOD, AND RECORDING MEDIUM

CROSS REFERENCE TO RELATED APPLICATIONS

This is a continuation application of PCT International Application No. PCT/JP2021/004224 filed on Feb. 5, 2021, designating the United States of America, which is based on and claims priority of U.S. Provisional Patent Application No. 62/981,235 filed on Feb. 25, 2020, and Japanese Patent Application No. 2020-146245 filed on Aug. 31, 2020. The entire disclosures of the above-identified applications, including the specifications, drawings and claims are incorporated herein by reference in their entirety.

FIELD

The present disclosure relates to a speaker identification apparatus, a speaker identification method, and a recording medium.

BACKGROUND

Speaker identification technology is a technology of estimating, based on the similarity between a feature value calculated from a registered utterance which is an utterance of each speaker subjected to registration and a feature value calculated from an evaluated utterance which is an utterance of an unknown speaker subjected to identification, which speaker's registered utterance the evaluated utterance is (for example, Patent Literature (PTL) 1).

For example, the speaker identification technology disclosed in PTL 1 identifies the speaker of the evaluated utterance using the vector similarity between a speaker feature vector in the registered utterance of each registered speaker and a speaker feature vector in the evaluated utterance.

CITATION LIST

Patent Literature

PTL 1: Japanese Unexamined Patent Application Publication No. 2017-187642

SUMMARY

Technical Problem

However, in the case where the evaluated voice is an emotional voice such as laughter or angry shout, the identification accuracy is affected. Specifically, if the emotion contained in the registered utterance and the emotion contained in the evaluated utterance are different, the speaker identification accuracy decreases due to variation in intonation associated with the emotion contained in the evaluated utterance.

The conventional speaker identification technology disclosed in PTL 1 calculates the similarity between the speaker feature vector in the registered utterance and the speaker feature vector in the evaluated utterance to identify the speaker of the evaluated utterance, without taking into account the emotion contained in the evaluated utterance. Thus, the conventional speaker identification technology may not be sufficiently accurate in identifying the speaker of the evaluated utterance.

The present disclosure has been made in view of the above-described circumstances, and has an object of providing a speaker identification apparatus, a speaker identification method, and a recording medium that can improve the speaker identification accuracy even in the case where an evaluated utterance, i.e. an utterance subjected to identification, contains the speaker's emotion.

Solution to Problem

A speaker identification apparatus according to an aspect of the present disclosure is a speaker identification apparatus that identifies a speaker of utterance data indicating a voice of an utterance subjected to identification, the speaker identification apparatus including: an emotion estimator that estimates, from an acoustic feature value calculated from the utterance data, an emotion contained in the voice of the utterance indicated by the utterance data, using a trained deep neural network (DNN); and a speaker identification processor that outputs, based on the acoustic feature value calculated from the utterance data, a score for identifying the speaker of the utterance data, using an estimation result of the emotion estimator.

These general and specific aspects may be implemented using a system, a method, an integrated circuit, a computer program, or a computer-readable recording medium such as CD-ROM, or any combination of systems, methods, integrated circuits, computer programs, and recording media.

Advantageous Effects

A speaker identification apparatus, etc. according to the present disclosure can improve the speaker identification accuracy even in the case where an utterance subjected to identification contains the speaker's emotion.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Outline of the Present Disclosure

Figure 1:
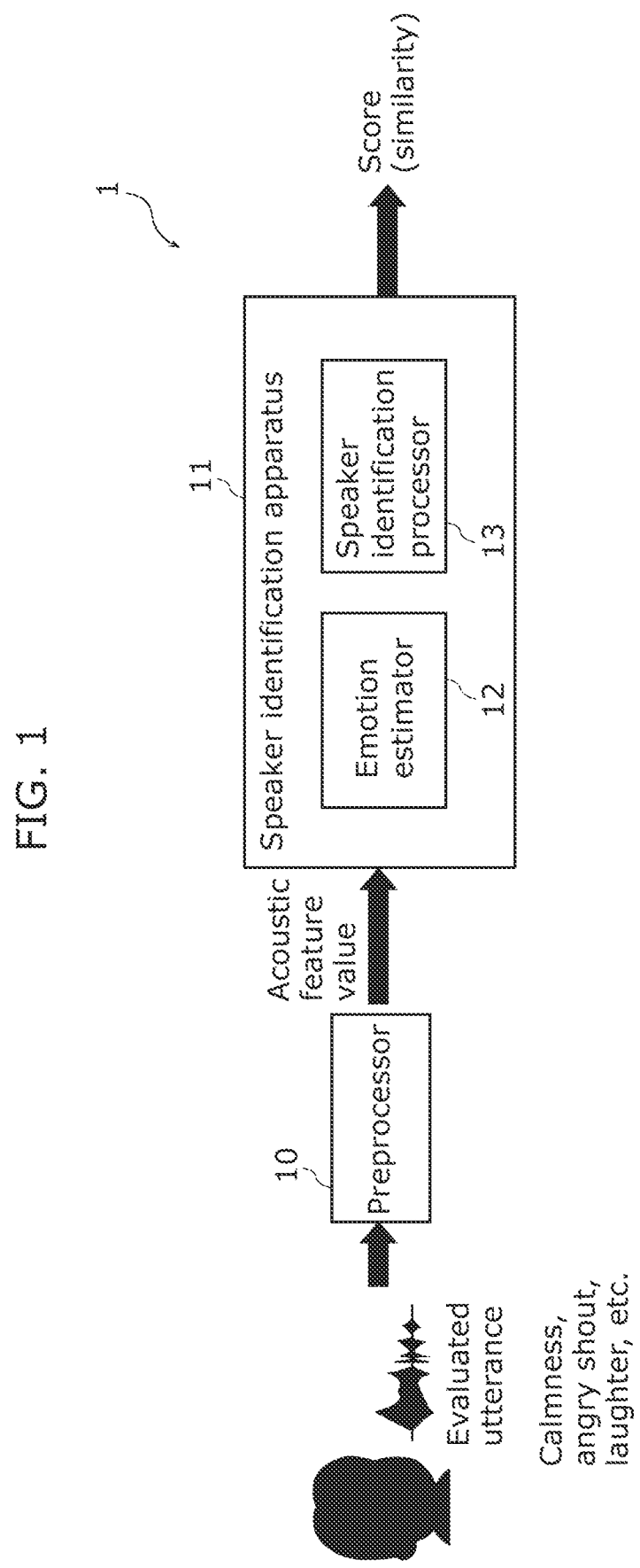
FIG. 1 is a block diagram illustrating an example of the structure of a speaker identification system according to one exemplary embodiment.

An outline of one form of the present disclosure is as follows.

A speaker identification apparatus according to an aspect of the present disclosure is a speaker identification apparatus that identifies a speaker of utterance data indicating a voice of an utterance subjected to identification, the speaker identification apparatus including: an emotion estimator that estimates, from an acoustic feature value calculated from the utterance data, an emotion contained in the voice of the utterance indicated by the utterance data, using a trained deep neural network (DNN); and a speaker identification processor that outputs, based on the acoustic feature value calculated from the utterance data, a score for identifying the speaker of the utterance data, using an estimation result of the emotion estimator.

This can improve the speaker identification accuracy even in the case where an utterance subjected to identification contains the speaker's emotion.

For example, the speaker identification processor may include: a plurality of speaker identifiers that each include a speaker feature value extractor and a similarity calculator, the speaker feature value extractor extracting, when receiving the acoustic feature value, a first speaker feature value that enables specification of the speaker of the voice of the utterance indicated by the utterance data from the acoustic feature value received, the similarity calculator calculating a similarity between the first speaker feature value extracted by the speaker feature value extractor and a second speaker feature value that is stored in a storage and enables specification of a voice of each of one or more registered speakers containing one emotion, the registered speaker being subjected to identification; and an identifier selector that selects, from the plurality of speaker identifiers, a speaker identifier in which the second speaker feature value that enables specification of the voice of the registered speaker containing one emotion corresponding to the emotion indicated by the estimation result is stored in the storage, and the speaker identifier selected by the identifier selector may calculate the similarity and outputs the similarity as the score, when receiving the acoustic feature value calculated from the utterance data.

For example, the speaker identification processor may include: a speaker feature value extractor that extracts, from the acoustic feature value, a first speaker feature value that enables specification of the speaker of the voice of the utterance indicated by the utterance data; a corrector that corrects a second speaker feature value that is stored in a storage and enables specification of a voice of each of one or more registered speakers containing one emotion, to a third speaker feature value that enables specification of a voice of the registered speaker containing one emotion corresponding to the emotion indicated by the estimation result, the registered speaker being subjected to identification; and a similarity calculator that calculates a similarity between the first speaker feature value extracted and the third speaker feature value resulting from correction by the corrector, and outputs, as the score, the similarity calculated.

For example, the speaker identification processor may include: a speaker feature value extractor that extracts, from the acoustic feature value, a first speaker feature value that enables specification of the speaker of the voice of the utterance indicated by the utterance data; a similarity calculator that calculates a similarity between the first speaker feature value extracted and a second speaker feature value that is stored in a storage and enables specification of a voice of each of one or more registered speakers containing one emotion, the registered speaker being subjected to identification; and a reliability assigner that assigns, to the similarity calculated, a weight according to the emotion indicated by the estimation result, and outputs, as the score, the similarity having the weight assigned thereto, and the reliability assigner may assign a largest weight to the similarity calculated, when the one emotion and the emotion indicated by the estimation result match.

For example, the acoustic feature value may be calculated, by a preprocessor, from each of a plurality of items of utterance data obtained by dividing overall utterance data by a unit of identification in chronological order, the overall utterance data indicating a voice of an utterance of the speaker during a predetermined period, and the reliability assigner may assign, to the similarity calculated by the similarity calculator for each of the plurality of items of utterance data, the weight according to the emotion indicated by the estimation result for the item of utterance data, and output, as the score, the similarity having the weight assigned thereto.

For example, the speaker identification apparatus may further include: a speaker identification device that identifies the speaker of the overall utterance data using an overall score, the overall score being an arithmetic mean of respective scores for the plurality of items of utterance data output from the reliability assigner, and the speaker identification device may identify the speaker of the overall utterance data using the overall score that is greater than or equal to a threshold.

For example, the speaker identification processor may include: a speaker feature value extractor that extracts, from the acoustic feature value, a first speaker feature value that enables specification of the speaker of the voice of the utterance indicated by the utterance data; a similarity calculator that calculates a similarity between the first speaker feature value extracted and a second speaker feature value that is stored in a storage and enables specification of a voice of each of one or more registered speakers containing one emotion, the registered speaker being subjected to identification; and a reliability degree assigner that assigns, to the similarity calculated, a reliability degree according to the emotion indicated by the estimation result, and outputs, as the score, the similarity having the reliability degree assigned thereto.

For example, the speaker identification apparatus may further include: a speaker identification device that identifies the speaker of the utterance data using the score to which the reliability degree greater than or equal to a threshold is assigned.

For example, the speaker feature value extractor may extract the first speaker feature value from the acoustic feature value using a trained DNN.

A speaker identification method according to an aspect of the present disclosure is a speaker identification method of identifying a speaker of utterance data indicating a voice of an utterance subjected to identification, the speaker identification method including: estimating, from an acoustic feature value calculated from the utterance data, an emotion contained in the voice of the utterance indicated by the utterance data, using a trained deep neural network (DNN); and outputting, based on the acoustic feature value calculated from the utterance data, a score for identifying the speaker of the utterance data, using an estimation result in the estimating.

A recording medium according to an aspect of the present disclosure is a non-transitory computer-readable recording medium having recorded thereon a computer program for causing a computer to execute: estimating, from an acoustic feature value calculated from the utterance data, an emotion contained in the voice of the utterance indicated by the utterance data, using a trained deep neural network (DNN); and outputting, based on the acoustic feature value calculated from the utterance data, a score for identifying the speaker of the utterance data, using an estimation result in the estimating.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described with reference to the accompanying drawings. Each of the exemplary embodiments described below shows a general or specific example. The numerical values, shapes, elements, steps, the processing order of the steps etc. shown in the following exemplary embodiments are mere examples, and therefore do not limit the scope of the appended claims and their equivalents. Therefore, among the elements in the following exemplary embodiments, those not recited in any one of the independent claims representing the broadest concepts are described as optional elements. Any elements in the exemplary embodiments may be combined.

Embodiment

A speaker identification apparatus, etc. according to an exemplary embodiment will be described below, with reference to the drawings.

[Speaker Identification System 1]

Figure 2:
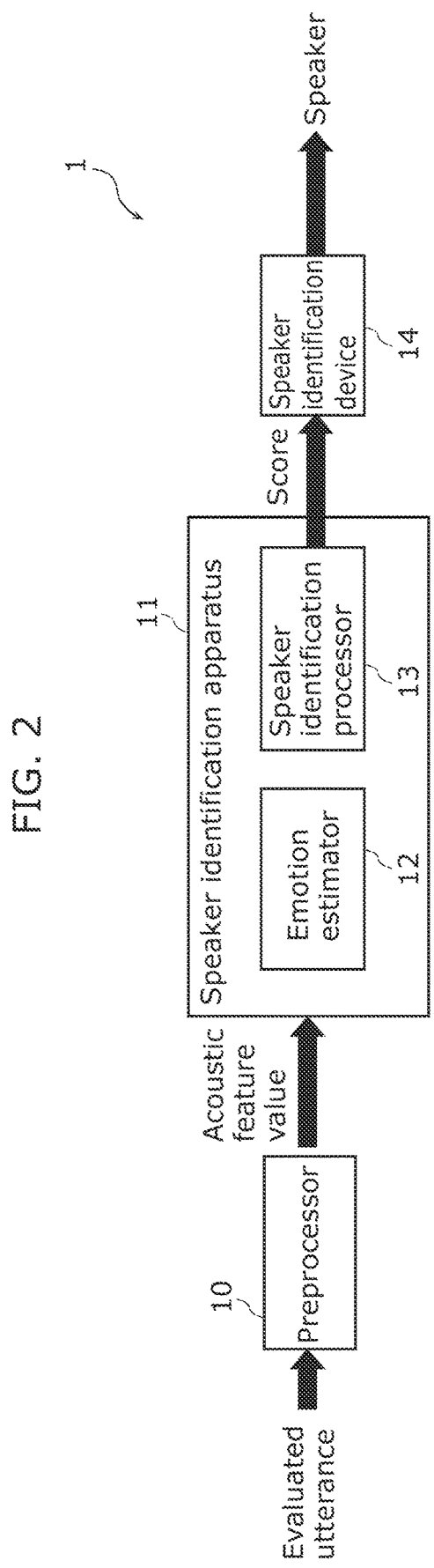
FIG. 2 is a block diagram illustrating another example of the structure of the speaker identification system according to the exemplary embodiment.

FIG. 1 is a block diagram illustrating an example of the structure of speaker identification system 1 according to this exemplary embodiment. FIG. 2 is a block diagram illustrating another example of the structure of speaker identification system 1 according to this exemplary embodiment.

Speaker identification system 1 according to this exemplary embodiment is used to identify a speaker of utterance data indicating a voice of an utterance that is subjected to identification and contains the speaker's emotion.

Speaker identification system 1 includes preprocessor 10 and speaker identification apparatus 11, as illustrated in FIG. 1. Speaker identification system 1 may further include speaker identification device 14 as illustrated in FIG. 2, although speaker identification device 14 is not an essential component. Each structural element will be described below.

[1. Preprocessor 10]

Figure 3:
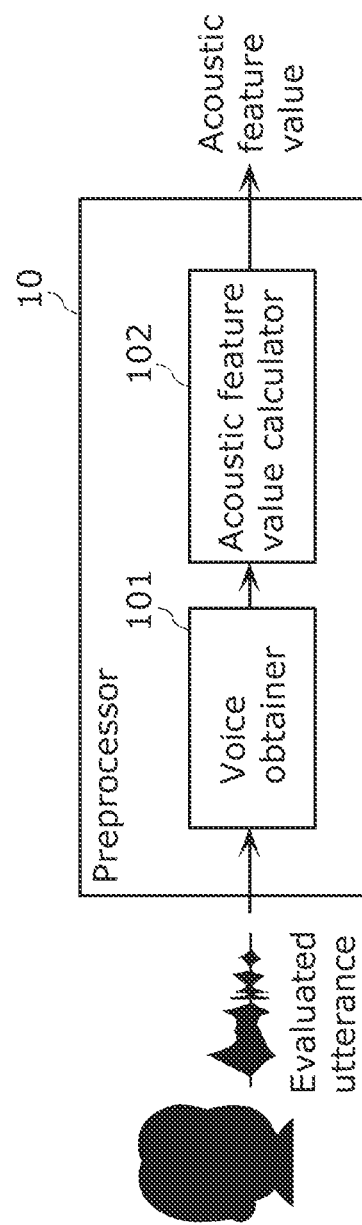
FIG. 3 is a block diagram illustrating an example of the detailed structure of a preprocessor according to the exemplary embodiment.

FIG. 3 is a block diagram illustrating an example of the detailed structure of preprocessor 10 according to this exemplary embodiment.

Preprocessor 10 obtains utterance data indicating a voice of an utterance subjected to identification, and outputs an acoustic feature value calculated from the obtained utterance data to speaker identification apparatus 11. In this exemplary embodiment, preprocessor 10 includes voice obtainer 101 and acoustic feature value calculator 102, as illustrated in FIG. 3.

[1.1 Voice Obtainer 101]

Voice obtainer 101 is, for example, composed of a microphone, and obtains a voice of an utterance of a speaker. Voice obtainer 101 converts the obtained voice into a voice signal, detects an utterance section which is a section of utterance from the voice signal, and outputs, to acoustic feature value calculator 102, utterance data indicating the voice of the utterance obtained by cutting out the utterance section.

Voice obtainer 101 may obtain a plurality of items of utterance data by dividing, by a unit of identification in chronological order, overall utterance data indicating the voice of the utterance of one speaker during a predetermined period, and output the plurality of items of utterance data to acoustic feature value calculator 102. The unit of identification is, for example, 3 to 4 seconds, and may be the foregoing utterance section.

[1.2 Acoustic Feature Value Calculator 102]

Acoustic feature value calculator 102 calculates an acoustic feature value for the voice of the utterance from the utterance data, i.e. the voice signal of the utterance section, output from voice obtainer 101. In this exemplary embodiment, acoustic feature value calculator 102 calculates, as the acoustic feature value, mel frequency cepstral coefficients (MFCCs) which are feature values of the voice of the utterance, from the utterance data output from voice obtainer 101. The MFCCs are feature values representing the vocal tract characteristics of the speaker, and are commonly used in voice recognition. More specifically, the MFCCs are an acoustic feature value resulting from analyzing the frequency spectrum of voice based on human aural characteristics. Acoustic feature value calculator 102 is not limited to calculating the MFCCs from the utterance data as the acoustic feature value. Acoustic feature value calculator 102 may calculate, as the acoustic feature value, the result of applying mel filter bank to the voice signal of the utterance, or the spectrogram of the voice signal of the utterance.

[2. Speaker Identification Apparatus 11]

Speaker identification apparatus 11 is, for example, implemented by a computer including a processor (microprocessor), memory, a communication interface, and the like. Speaker identification apparatus 11 may operate in a state of being included in a server, or operate in a state in which part of speaker identification apparatus 11 is included in a cloud server. Speaker identification apparatus 11 performs a process of identifying the speaker of the utterance data indicating the voice of the utterance subjected to identification, i.e. evaluated utterance. More specifically, speaker identification apparatus 11 outputs a score representing the similarity between a first speaker feature value of the evaluated utterance and a second speaker feature value of a registered utterance of each registered speaker, as an identification result. In this exemplary embodiment, the evaluated utterance, i.e. the utterance subjected to identification, contains the speaker's emotion.

Figure 4:
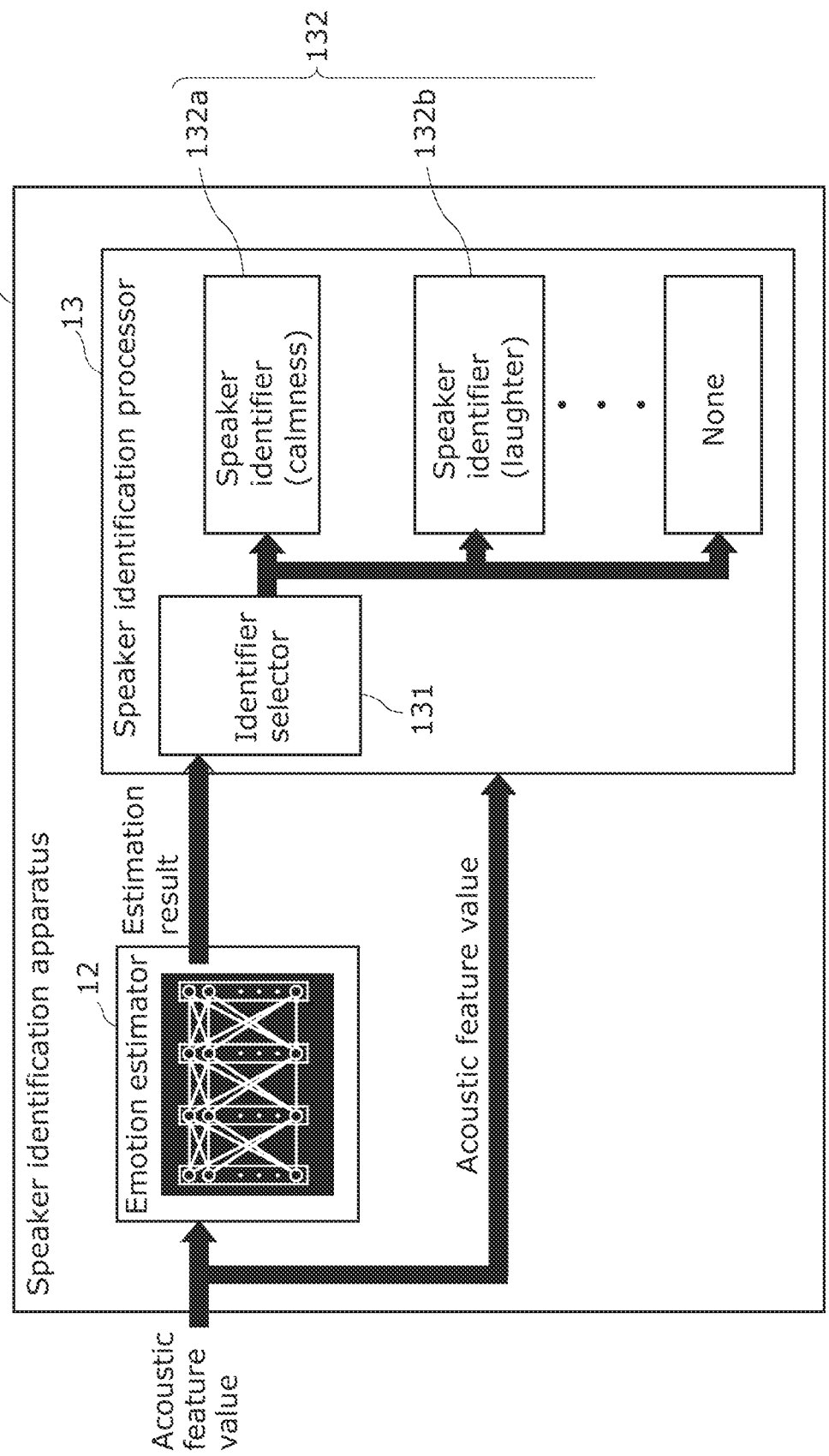
FIG. 4 is a block diagram illustrating an example of the detailed structure of a speaker identification apparatus according to the exemplary embodiment.

FIG. 4 is a block diagram illustrating an example of the detailed structure of speaker identification apparatus 11 according to this exemplary embodiment.

Speaker identification apparatus 11 includes emotion estimator 12 and speaker identification processor 13, as illustrated in FIG. 1 and FIG. 4.

[2.1 Emotion Estimator 12]

Emotion estimator 12 estimates, from the acoustic feature value calculated from the utterance data, the emotion contained in the voice of the utterance indicated by the utterance data, using a trained deep neural network (DNN). Examples of the DNN that can be used include a convolutional neural network (CNN), a fully-connected neural network (NN), and a time-delay neural network (TDNN).

An example of the structure of emotion estimator 12 will be described below, with reference to FIG. 5.

Figure 5:
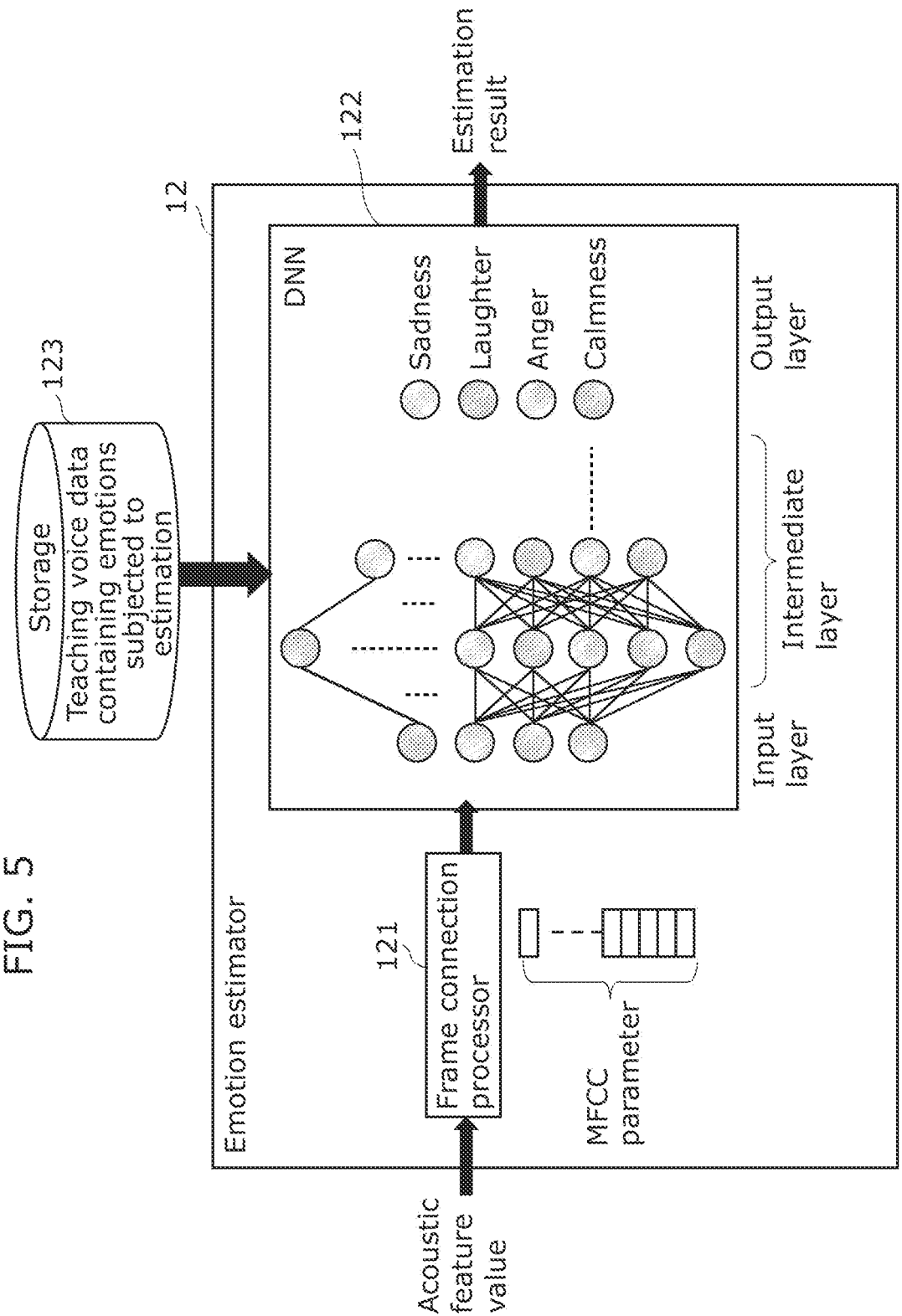
FIG. 5 is a diagram illustrating an example of the structure of an emotion estimator according to the exemplary embodiment.

FIG. 5 is a diagram illustrating an example of the structure of emotion estimator 12 according to this exemplary embodiment.

Emotion estimator 12 includes frame connection processor 121 and DNN 122, as illustrated in FIG. 5 as an example.

[2.1.1 Frame Connection Processor 121]

Frame connection processor 121 connects a plurality of frames of the MFCCs which are the acoustic feature value output from preprocessor 10, and outputs the result to an input layer of DNN 122. The MFCCs are composed of a plurality of frames each having an x-dimensional feature value (where x is a positive integer). In the example illustrated in FIG. 5, frame connection processor 121 connects 50 frames of MFCC parameters that are feature values of 24 dimensions/frame to generate a 1200-dimensional vector, and outputs the 1200-dimensional vector to the input layer of DNN 122.

[2.1.2 DNN 122]

DNN 122, having received the connected plurality of frames of the MFCCs, outputs an emotion label of the highest probability as an estimation result of emotion estimator 12. In the example illustrated in FIG. 5, DNN 122 is a neural network composed of an input layer, a plurality of intermediate layers, and an output layer, and is trained using teaching data stored in storage 123, i.e. teaching voice data containing emotions subjected to estimation. The input layer, for example, is made up of 1200 nodes, and receives input of a 1200-dimensional vector generated by connecting 50 frames of MFCC parameters that are feature values of 24 dimensions/frame. The output layer, for example, is made up of nodes for outputting emotion labels such as calmness, anger, laughter, and sadness, and outputs the emotion label of the highest probability. The plurality of intermediate layers are, for example, two or three intermediate layers.

[2.2 Speaker Identification Processor 13]

Speaker identification processor 13 outputs, based on the acoustic feature value calculated from the utterance data, a score for identifying the speaker of the utterance data, using the estimation result of emotion estimator 12.

In this exemplary embodiment, speaker identification processor 13 includes identifier selector 131 and a plurality of speaker identifiers 132, as illustrated in FIG. 4.

[2.2.1 Plurality of Speaker Identifiers 132]

The plurality of speaker identifiers 132 are each a speaker identifier 132$k$ (where k is a natural number) corresponding to one emotion. Herein, "one emotion" is, for example, one of calmness, anger, laughter, sadness, . . . . In the example illustrated in FIG. 4, the plurality of speaker identifiers 132 are speaker identifier 132*a*, speaker identifier 132*b*, . . . . For example, speaker identifier 132*a* corresponds to calmness as one emotion, and speaker identifier 132*b* corresponds to laughter as one emotion. One of speaker identifier 132*a*, speaker identifier 132*b*, . . . is referred to as "speaker identifier 132$k$".

Speaker identifier 132$k$ selected from the plurality of speaker identifiers 132 by identifier selector 131, having received the acoustic feature value calculated from the utterance data, calculates similarity, and outputs the similarity as a score. In some cases, none of the plurality of speaker identifiers 132 is selected by identifier selector 131. This is expressed as identifier selector 131 selecting "none" in FIG. 4.

Speaker identifier 132*b* corresponding to laughter will be described below as an example of the structure of speaker identifier 132$k$, with reference to FIG. 6.

Figure 6:
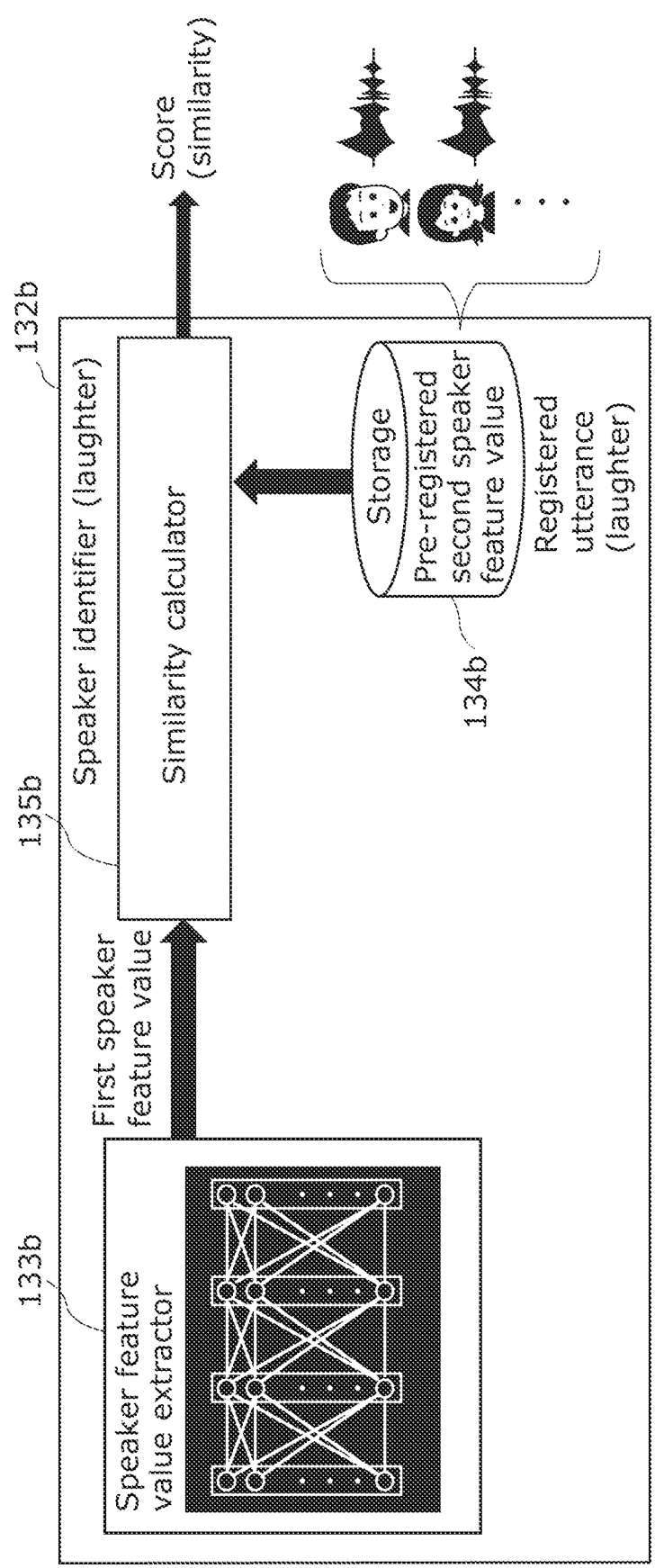
FIG. 6 is a diagram illustrating an example of the structure of a speaker identifier according to the exemplary embodiment.
Figure 7:
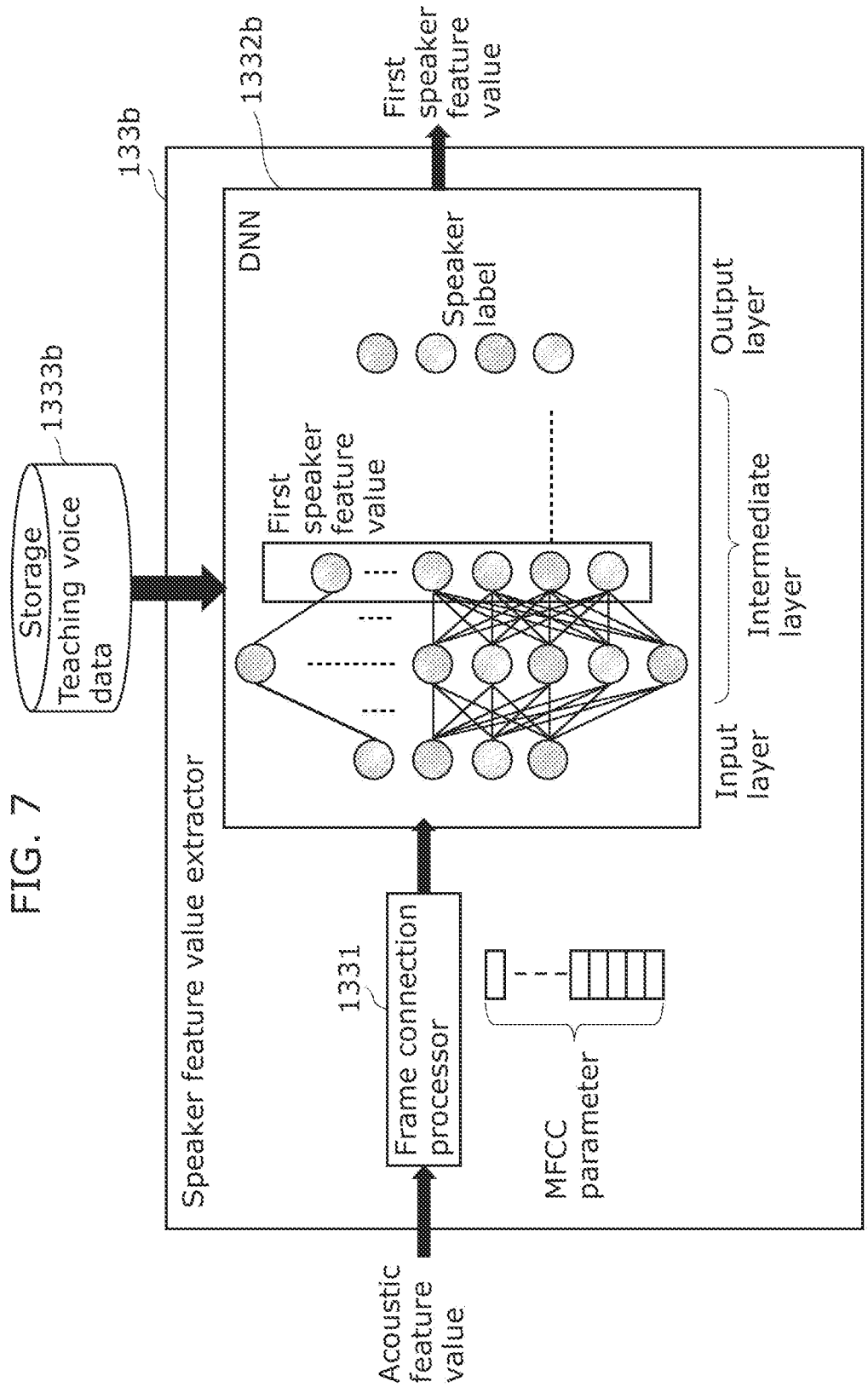
FIG. 7 is a diagram illustrating an example of the structure of a speaker feature value extractor included in the speaker identifier according to the exemplary embodiment.

FIG. 6 is a diagram illustrating an example of the structure of speaker identifier 132*b* according to this exemplary embodiment. FIG. 7 is a diagram illustrating an example of the structure of speaker feature value extractor 133*b* included in speaker identifier 132*b* according to this exemplary embodiment.

Speaker identifier 132*b* includes speaker feature value extractor 133*b*, storage 134*b*, and similarity calculator 135*b*, as illustrated in FIG. 6 as an example.

[2.2.1.1 Speaker Feature Value Extractor 133*b*]

Speaker feature value extractor 133*b*, having received the acoustic feature value calculated from the utterance data, extracts, from the input acoustic feature value, a first speaker feature value that enables specification of the speaker of the voice of the utterance indicated by the utterance data. More specifically, speaker feature value extractor 133*b* extracts the first speaker feature value from the acoustic feature value using a trained DNN.

In this exemplary embodiment, speaker feature value extractor 133*b* extracts the first speaker feature value using, for example, the x-vector method. The x-vector method is a method of calculating a speaker feature value which is a speaker-specific feature called x-vector. More specifically, speaker feature value extractor 133*b* includes frame connection processor 1331 and DNN 1332*b*, as illustrated in FIG. 7 as an example.

[2.2.1.1-1 Frame Connection Processor 1331]

Frame connection processor 1331 performs the same process as frame connection processor 121. In detail, frame connection processor 1331 connects a plurality of frames of the MFCCs which are the acoustic feature value output from preprocessor 10, and outputs the result to an input layer of DNN 1332*b*. In the example illustrated in FIG. 7, frame connection processor 1331 connects 50 frames of MFCC parameters that are feature values of 24 dimensions/frame to generate a 1200-dimensional vector, and outputs the 1200-dimensional vector to the input layer of DNN 1332*b*.

[2.2.1.1-2 DNN 1332*b*]

DNN 1332*b*, having received the plurality of frames from frame connection processor 1331, outputs the first speaker feature value. In the example illustrated in FIG. 7, DNN 1332*b* is a neural network composed of an input layer, a plurality of intermediate layers, and an output layer, and is trained using teaching voice data that is teaching data stored in storage 1333*b*. In the example illustrated in FIG. 7, storage 1333*b* stores teaching voice data including the voices of a plurality of speakers containing laughter as one emotion.

In FIG. 7, the input layer, for example, is made up of 1200 nodes, and receives input of a 1200-dimensional vector generated by connecting 50 frames of MFCC parameters that are feature values of 24 dimensions/frame. The output layer is made up of nodes for outputting speaker labels corresponding one-to-one to the speakers included in the teaching data. The plurality of intermediate layers are, for example, two or three intermediate layers, and include an intermediate layer for calculating the first speaker feature value. The intermediate layer for calculating the first speaker feature value outputs the calculated first speaker feature value as output of DNN 1332b.

[2.2.1.2 Storage 134b]

Storage 134b is, for example, rewritable nonvolatile memory such as a hard disk drive or a solid state drive, and stores one or more pre-registered second speaker feature values each of which is a feature value unique to a registered speaker and was calculated from a registered utterance of the registered speaker. In other words, storage 134b stores one or more second speaker feature values each of which enables specification of a voice of a registered speaker containing one emotion. More specifically, storage 134b stores a second speaker feature value of a registered utterance of one or more registered speakers containing emotion of laughter, as illustrated in FIG. 6.

[2.2.1.3 Similarity Calculator 135b]

Similarity calculator 135b calculates the similarity between the first speaker feature value extracted by speaker feature value extractor 133b and each pre-registered second speaker feature value stored in storage 134b.

In this exemplary embodiment, similarity calculator 135b calculates the similarity between the first speaker feature value extracted by speaker feature value extractor 133b and the second speaker feature value of each of one or more registered speakers stored in storage 134b. Similarity calculator 135b outputs a score representing the calculated similarity.

For example, similarity calculator 135b may calculate the cosine using the inner product in a vector space model to calculate, as the similarity, the cosine distance (also referred to as "cosine similarity") indicating the inter-vector angle between the first speaker feature value and the second speaker feature value. In this case, a larger numerical value of the inter-vector angle indicates lower similarity. Similarity calculator 135b may calculate, as the similarity, the cosine distance that takes a value of −1 to 1 using the inner product of the vector indicating the first speaker feature value and the vector indicating the second speaker feature value. In this case, a larger numerical value of the cosine distance indicates higher similarity.

Speaker identifier 132a corresponding to calmness, etc. are the same as speaker identifier 132b corresponding to laughter, and accordingly their description is omitted.

[2.2.2 Identifier Selector 131]

Identifier selector 131 selects one speaker identifier 132k from the plurality of speaker identifiers 132 according to the emotion indicated by the estimation result of emotion estimator 12. More specifically, identifier selector 131 selects speaker identifier 132k that stores, in its storage, one or more second speaker feature values each of which enables specification of a voice of a registered speaker containing one emotion corresponding to the emotion indicated by the estimation result of emotion estimator 12. In the case where there is no speaker identifier 132 that corresponds to the emotion indicated by the estimation result of emotion estimator 12, identifier selector 131 may not use any speaker identifier 132 ("none").

Thus, identifier selector 131 can switch between speaker identifiers 132 according to the estimation result of emotion estimator 12.

[3. Speaker Identification Device 14]

Speaker identification device 14, in the case of being included in speaker identification system 1 as illustrated in FIG. 2 as an example, identifies the speaker of the utterance data using the score output from speaker identification apparatus 11.

In this exemplary embodiment, speaker identification device 14 identifies the speaker of the utterance data based on the score representing the similarity calculated by similarity calculator 135b. For example, speaker identification device 14 identifies a registered speaker corresponding to a second speaker feature value closest to the first speaker feature value using such a score, and outputs the identification result.

[Operation of Speaker Identification System 1]

The operation of speaker identification system 1 having the above-described structure will be described below. The following will describe the operation of speaker identification apparatus 11 which is characteristic operation as the operation of speaker identification system 1.

Figure 8:
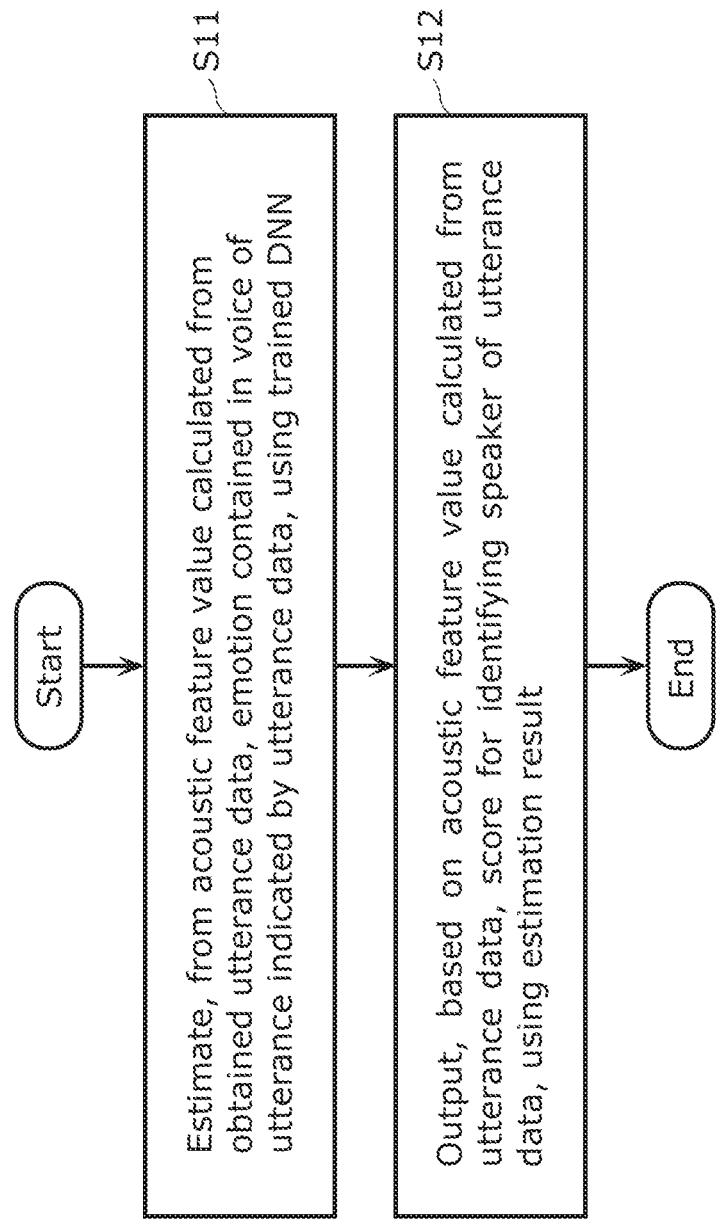
FIG. 8 is a flowchart illustrating an overview of the operation of the speaker identification apparatus according to the exemplary embodiment.

FIG. 8 is a flowchart illustrating an overview of the operation of speaker identification apparatus 11 according to this exemplary embodiment.

Speaker identification apparatus 11 first estimates, from an acoustic feature value calculated from utterance data, emotion contained in a voice of an utterance indicated by the utterance data, using the trained DNN (S11).

Speaker identification apparatus 11 then outputs, based on the acoustic feature value calculated from the utterance data, a score for identifying the speaker of the utterance data, using the estimation result in Step S11 (S12).

[Effects, Etc.]

As described above, in speaker identification apparatus 11 according to this exemplary embodiment, emotion estimator 12 that estimates emotion contained in an evaluated utterance is located upstream of the plurality of speaker identifiers 132 each corresponding to a different emotion, and one of the plurality of speaker identifiers 132 is selected according to the emotion indicated by the estimation result of emotion estimator 12.

Thus, speaker identifier 132 corresponding to the emotion contained in the evaluated utterance can be used. Consequently, the speaker of the evaluated utterance can be identified in a state in which the emotion contained in the registered utterance and the emotion contained in the evaluated utterance match.

Speaker identification apparatus 11 according to this exemplary embodiment can therefore improve the speaker identification accuracy even in the case where an utterance subjected to identification contains the speaker's emotion.

Moreover, with speaker identification system 1 including speaker identification apparatus 11 according to this exemplary embodiment, the speakers of free utterances, such as conversations and not reading aloud sentences, can be identified in a conference proceedings system, a communication visualization system, etc.

Variation 1

The method of identifying the speaker of utterance data indicating a voice of an utterance subjected to identification and containing the speaker's emotion is not limited to the method described in the foregoing exemplary embodiment, i.e. the method of providing the plurality of speaker identifiers 132 downstream of emotion estimator 12. An example of a method different from the method described in the foregoing exemplary embodiment will be described below as Variation 1, mainly focusing on the differences from the foregoing exemplary embodiment.

[4. Speaker Identification Apparatus 11A]

Figure 9:
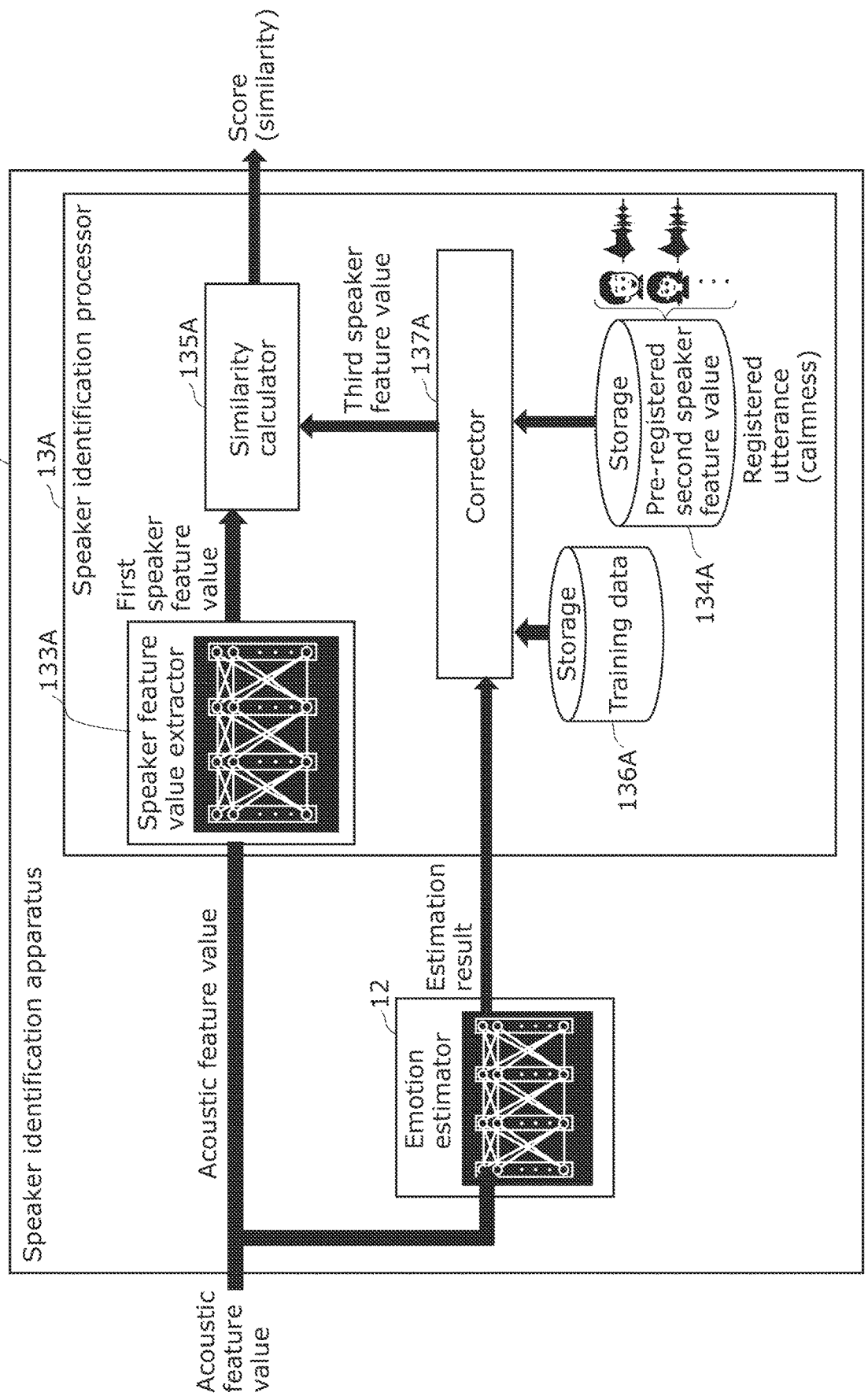
FIG. 9 is a block diagram illustrating an example of the detailed structure of a speaker identification apparatus according to Variation 1 of the exemplary embodiment.

FIG. 9 is a block diagram illustrating an example of the detailed structure of speaker identification apparatus 11A according to Variation 1 of the exemplary embodiment. The same elements as those in FIG. 4, etc. are given the same reference signs, and their detailed description is omitted.

Speaker identification apparatus 11A performs a process of identifying the speaker of utterance data indicating a voice of an utterance subjected to identification. More specifically, speaker identification apparatus 11A outputs a score representing the similarity between a first speaker feature value of the evaluated utterance and a third speaker feature value obtained by correcting a second speaker feature value of a registered utterance of each registered speaker, as an identification result.

As illustrated in FIG. 9, speaker identification apparatus 11A according to this variation differs from speaker identification apparatus 11 illustrated in FIG. 4 in the structure of speaker identification processor 13A.

[4.1 Speaker Identification Processor 13A]

Speaker identification processor 13A outputs, based on the acoustic feature value calculated from the utterance data, a score for identifying the speaker of the utterance data, using the estimation result of emotion estimator 12.

In this variation, speaker identification processor 13A includes speaker feature value extractor 133A, storage 134A, similarity calculator 135A, storage 136A, and corrector 137A, as illustrated in FIG. 9.

[4.1.1 Speaker Feature Value Extractor 133A]

Speaker feature value extractor 133A extracts, from the acoustic feature value calculated from the utterance data, a first speaker feature value that enables specification of the speaker of the voice of the utterance indicated by the utterance data.

In this variation, too, speaker feature value extractor 133A extracts the first speaker feature value using, for example, the x-vector method. Speaker feature value extractor 133A accordingly includes a frame connection processor and a DNN, as in speaker feature value extractor 133b. In this variation, the DNN is trained using teaching voice data including the voices of a plurality of speakers (speakers subjected to identification) containing, for example, calmness as one emotion. Calmness is an example of one emotion, and other emotions such as laughter are equally applicable. Such other emotions are as described in the foregoing exemplary embodiment, and accordingly their description is omitted.

[4.1.2 Storage 134A]

Storage 134A is, for example, rewritable nonvolatile memory such as a hard disk drive or a solid state drive, and stores one or more pre-registered second speaker feature values each of which enables specification of a voice of a registered speaker containing one emotion. In this variation, storage 134A stores a second speaker feature value of a registered utterance of one or more registered speakers containing emotion of calmness, as illustrated in FIG. 9. Emotion of calmness is an example, and other emotions such as laughter are equally applicable.

[4.1.3 Storage 136A]

Storage 136A is, for example, rewritable nonvolatile memory such as a hard disk drive or a solid state drive, and stores training data for correcting the emotion contained in each registered utterance. In this variation, the training data stored in storage 136A is used to correct each second speaker feature value for emotion of calmness stored in storage 134A to a third speaker feature value which is a speaker feature value of an utterance of emotion corresponding to the emotion indicated by the estimation result of emotion estimator 12.

[4.1.4 Corrector 137A]

Corrector 137A corrects each second speaker feature value stored in storage 134A to a third speaker feature value that enables specification of a voice containing one emotion corresponding to the emotion indicated by the estimation result of emotion estimator 12.

For example, suppose the emotion indicated by the estimation result of emotion estimator 12 is "laughter". In such a case, corrector 137A corrects each second speaker feature value of a registered utterance of a registered speaker containing emotion "calmness" stored in storage 134A to a third speaker feature value that enables specification of a voice containing emotion "laughter", using the training data stored in storage 136A. That is, corrector 137A corrects each second speaker feature value for emotion "calmness" stored in storage 134A to a third speaker feature value for the emotion indicated by the estimation result of emotion estimator 12, using the training data stored in storage 136A.

[4.1.5 Similarity Calculator 135A]

Similarity calculator 135A calculates the similarity between the first speaker feature value extracted by speaker feature value extractor 133A and each third speaker feature value resulting from the correction by corrector 137A, and outputs the calculated similarity as a score.

In this variation, similarity calculator 135A calculates the similarity between the first speaker feature value extracted by speaker feature value extractor 133A and the third speaker feature value obtained by correcting the second speaker feature value of each of one or more registered speakers stored in storage 134A. Similarity calculator 135A outputs a score representing the calculated similarity.

[5. Speaker Identification Device 14]

Speaker identification device 14 identifies the speaker of the utterance data using the score output from speaker identification apparatus 11A.

In this variation, speaker identification device 14 identifies the speaker of the utterance data based on the score representing the similarity calculated by similarity calculator 135A. For example, speaker identification device 14 identifies a registered speaker of a second speaker feature value corresponding to a third speaker feature value closest to the first speaker feature value using such a score, and outputs the identification result.

[Effects, Etc.]

As described above, in speaker identification apparatus 11A according to this variation, speaker identification processor 13A located downstream corrects the emotion of the registered utterance to the emotion of the evaluated utterance according to the estimation result of emotion estimator 12 located upstream, and then identifies the speaker of the evaluated utterance.

Thus, the speaker of the evaluated utterance can be identified in a state in which the emotion contained in the registered utterance and the emotion contained in the evaluated utterance match, that is, in a state in which the difference in emotion, i.e. intonation, between the registered utterance and the evaluated utterance is corrected so that the emotion contained in the registered utterance will match the emotion contained in the evaluated utterance.

Speaker identification apparatus 11A according to this variation can therefore improve the speaker identification accuracy even in the case where an utterance subjected to identification contains the speaker's emotion.

Variation 2

The presently disclosed method is not limited to the cases described in the foregoing exemplary embodiment and Variation 1. A structure different from the speaker identification apparatuses described in the foregoing exemplary embodiment and Variation 1 will be described below.

[6. Speaker Identification Apparatus 11B]

Figure 10:
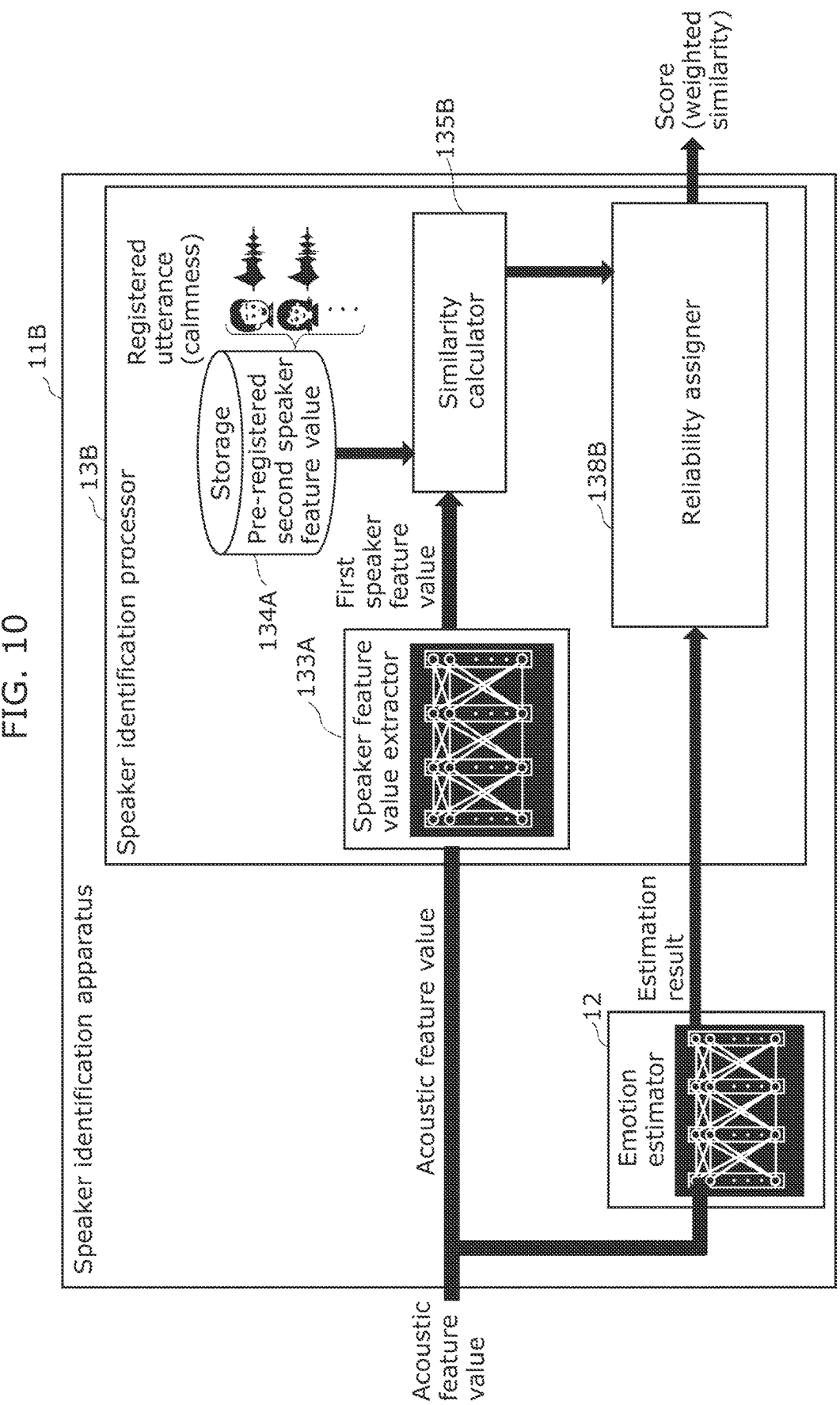
FIG. 10 is a block diagram illustrating an example of the detailed structure of a speaker identification apparatus according to Variation 2 of the exemplary embodiment.

FIG. 10 is a block diagram illustrating an example of the detailed structure of speaker identification apparatus 11B according to Variation 2 of the exemplary embodiment. The same elements as those in FIG. 4, FIG. 9, etc. are given the same reference signs, and their detailed description is omitted.

Speaker identification apparatus 11B performs a process of identifying the speaker of utterance data indicating a voice of an utterance subjected to identification, as with speaker identification apparatus 11. More specifically, speaker identification apparatus 11B calculates the similarity between the first speaker feature value of the evaluated utterance and the second speaker feature value of the registered utterance of each registered speaker. Speaker identification apparatus 11B then outputs a score obtained by assigning reliability to the calculated similarity, as the identification result. This variation describes the case of assigning a weight as reliability.

As illustrated in FIG. 10, speaker identification apparatus 11B according to this variation differs from speaker identification apparatus 11 illustrated in FIG. 4 in the structure of speaker identification processor 13B. Speaker identification apparatus 11B according to this variation also differs from speaker identification apparatus 11A illustrated in FIG. 9 in the structure of speaker identification processor 13B.

[6.1 Speaker Identification Processor 13B]

Speaker identification processor 13B outputs, based on the acoustic feature value calculated from the utterance data, a score for identifying the speaker of the utterance data, using the estimation result of emotion estimator 12.

Here, the acoustic feature value obtained by speaker identification processor 13B has been calculated from each of a plurality of items of utterance data obtained by preprocessor 10 dividing, by a unit of identification in chronological order, overall utterance data indicating the voice of the utterance of one speaker during a predetermined period.

In this variation, speaker identification processor 13B includes speaker feature value extractor 133A, storage 134A, similarity calculator 135B, and reliability assigner 138B, as illustrated in FIG. 10.

[6.1.1 Similarity Calculator 135B]

Similarity calculator 135B calculates the similarity between the first speaker feature value extracted by speaker feature value extractor 133A and each pre-registered second speaker feature value that is stored in storage 134A and enables specification of a voice of a registered speaker (speaker subjected to identification) containing one emotion.

In this variation, similarity calculator 135B calculates the similarity between the first speaker feature value extracted by speaker feature value extractor 133A and the second speaker feature value of the registered utterance of each of one or more registered speakers containing emotion "calmness" stored in storage 134A.

[6.1.2 Reliability Assigner 138B]

Reliability assigner 138B assigns, to the similarity calculated by similarity calculator 135B, a weight according to the emotion indicated by the estimation result of emotion estimator 12, and outputs the result as a score. Here, in the case where the one emotion and the emotion indicated by the estimation result match, reliability assigner 138B assigns the largest weight to the calculated similarity.

In this variation, reliability assigner 138B assigns, to the similarity calculated by similarity calculator 135B for each of the plurality of items of utterance data, a weight according to the emotion indicated by the estimation result of emotion estimator 12 for the item of utterance data. Reliability assigner 138B outputs the similarity having the weight assigned thereto for each of the plurality of items of utterance data to speaker identification device 14, as a score for the item of utterance data.

[7. Speaker Identification Device 14]

Speaker identification device 14, in the case of being included in speaker identification system 1 as illustrated in FIG. 2 as an example, identifies the speaker of the utterance data using the score output from speaker identification apparatus 11B.

In this variation, speaker identification device 14 identifies the speaker of the utterance data based on the score representing the weighted similarity output from similarity calculator 135B. In more detail, speaker identification device 14 identifies the speaker of the overall utterance data using an overall score that is an arithmetic mean of the respective scores for the plurality of items of utterance data output from reliability assigner 138B. Here, speaker identification device 14 identifies the speaker of the overall utterance using an overall score greater than or equal to a threshold. Speaker identification device 14 then outputs the identified speaker of the overall utterance as the identification result. By using only an overall score of high reliability, speaker identification device 14 can accurately identify the speaker of the overall utterance data corresponding to the overall score.

[Example of Process by Speaker Identification Apparatus 11B]

An example of a process by speaker identification apparatus 11B having the above-described structure will be described below, with reference to FIG. 11.

Figure 11:
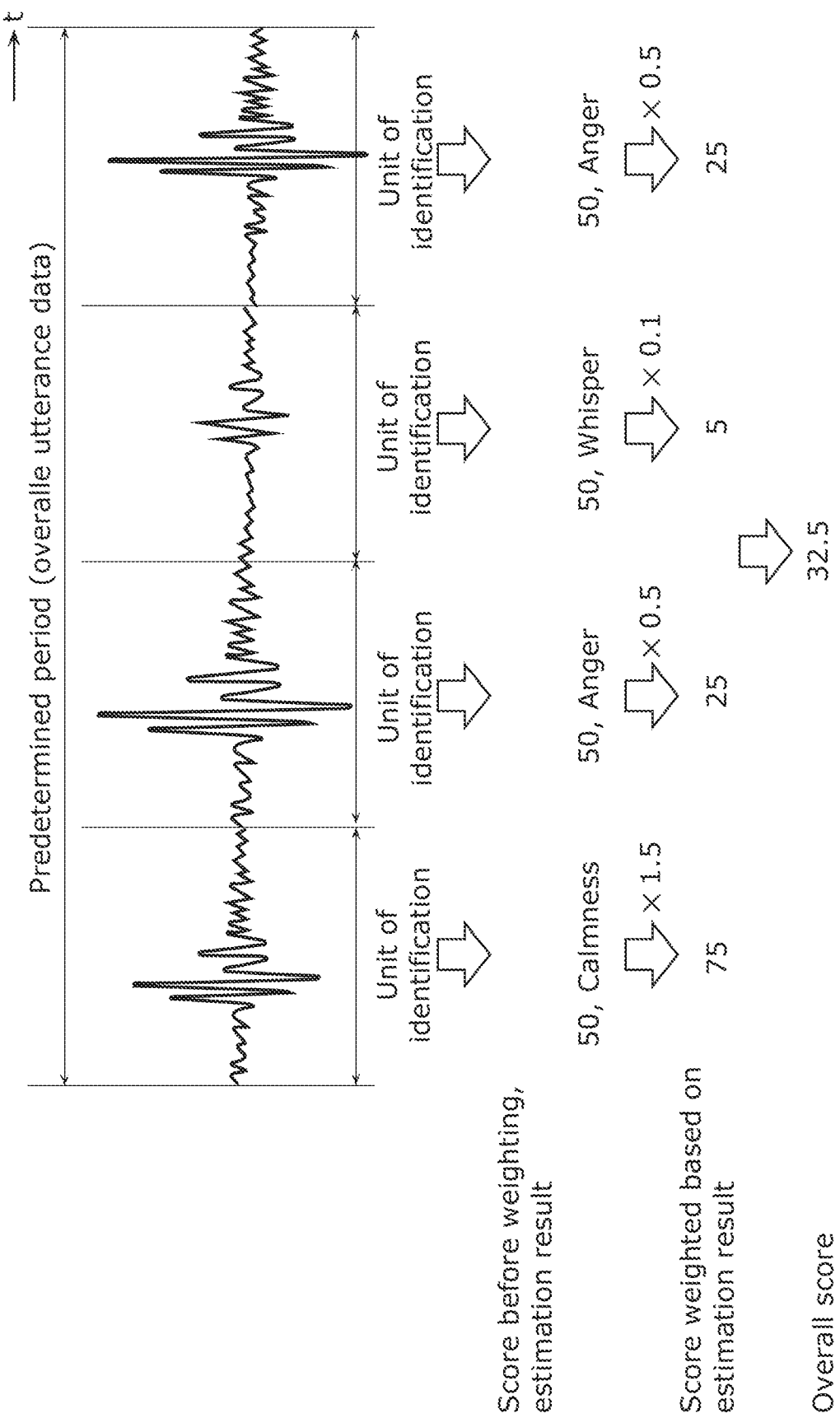
FIG. 11 is a diagram illustrating an example of a process by the speaker identification apparatus according to Variation 2 of the exemplary embodiment.

FIG. 11 is a diagram illustrating an example of a process by speaker identification apparatus 11B according to Variation 2 of the exemplary embodiment. The first row (top part) in FIG. 11 illustrates overall utterance data obtained by speaker identification apparatus 11B. The overall utterance data is a voice signal obtained by converting a voice of an utterance of one speaker during a predetermined period, and is made up of a plurality of items of utterance data obtained by dividing the overall utterance data by a unit of identification, as mentioned above. In the example illustrated in FIG. 11, the unit of identification is 3 to 4 seconds, and the overall utterance data is a voice signal of a voice of 12 to 16 seconds and is divided into four voice signals in the unit of identification. The data obtained by dividing the overall utterance data by the unit of identification is the foregoing utterance data.

The second row in FIG. 11 illustrates a score before weighting and an estimation result for each of the plurality of items of utterance data. The score before weighting represents the similarity calculated by speaker identification apparatus 11B for each of the plurality of items of utterance data constituting the overall utterance data. The estimation result is the emotion contained in the voice of the utterance indicated by each of the plurality of items of utterance data, which is estimated by speaker identification apparatus 11B. In the example illustrated in FIG. 11, the scores and emotions of the respective items of utterance data of the overall utterance data (i.e. divided by the unit of identification) are (50, calmness), (50, anger), (50, whisper), and (50, anger).

The third row in FIG. 11 illustrates a score weighted based on the estimation result. This score is the similarity weighted based on the estimation result of each of the plurality of items of utterance data, and represents the similarity for the item of utterance data. In the example illustrated in FIG. 11, the largest weight is assigned when the emotion indicated by the estimation result is calmness, and the scores of the respective items of utterance data of the overall utterance data (i.e. divided by the unit of identification) are 75, 25, 5, and 25. The reason why the largest weight is assigned when the emotion indicated by the estimation result is "calmness" is because speaker identification apparatus 11B calculates the similarity for each of the plurality of items of utterance data using the second speaker feature value of the registered utterance of the registered speaker containing emotion "calmness". That is, when there is a greater match between the emotion contained in the evaluated utterance and the emotion that can be contained in the registered utterance used to obtain the second speaker feature value used in the similarity calculation by speaker identification apparatus 11B, a larger weight is assigned on the ground that the calculated similarity has higher reliability.

The fourth row in FIG. 11 illustrates an overall score. The overall score is a score for the overall utterance data, and is an arithmetic mean of the respective scores of the plurality of items of utterance data, as mentioned above. In the example illustrated in FIG. 11, the overall score is 32.5.

[Effects, Etc.]

As described above, in speaker identification apparatus 11B according to this variation, speaker identification processor 13B outputs the score obtained by assigning, to the calculated similarity between the evaluated utterance and the registered utterance, the weight based on the estimation result of the emotion of the evaluated utterance. Here, when the match between the emotion contained in the evaluated utterance as indicated by the estimation result and the emotion contained in the registered utterance is greater, speaker identification processor 13B assigns a larger weight on the ground that the calculated similarity has higher reliability.

Thus, by using a score of high reliability, the speaker of the evaluated utterance can be identified in a state in which the emotion contained in the registered utterance and the emotion contained in the evaluated utterance are close (similar).

Speaker identification apparatus 11B according to this variation can therefore improve the speaker identification accuracy even in the case where an utterance subjected to identification contains the speaker's emotion.

The reliability of the speaker identification result may be determined with reference to the reliability of the score.

Variation 3

In Variation 2, speaker identification apparatus 11B outputs the score obtained by assigning, to the calculated similarity, the weight as reliability based on the estimation result of the emotion contained in the evaluated utterance. In Variation 3, speaker identification apparatus 11C assigns, to the calculated similarity, the reliability degree (specifically, additional information representing the reliability degree) based on the estimation result of the emotion contained in the evaluated utterance, and outputs the result. Speaker identification apparatus 11C according to Variation 3 will be described below, mainly focusing on the differences from speaker identification apparatus 11B according to Variation 2.

[8. Speaker Identification Apparatus 11C]

Figure 12:
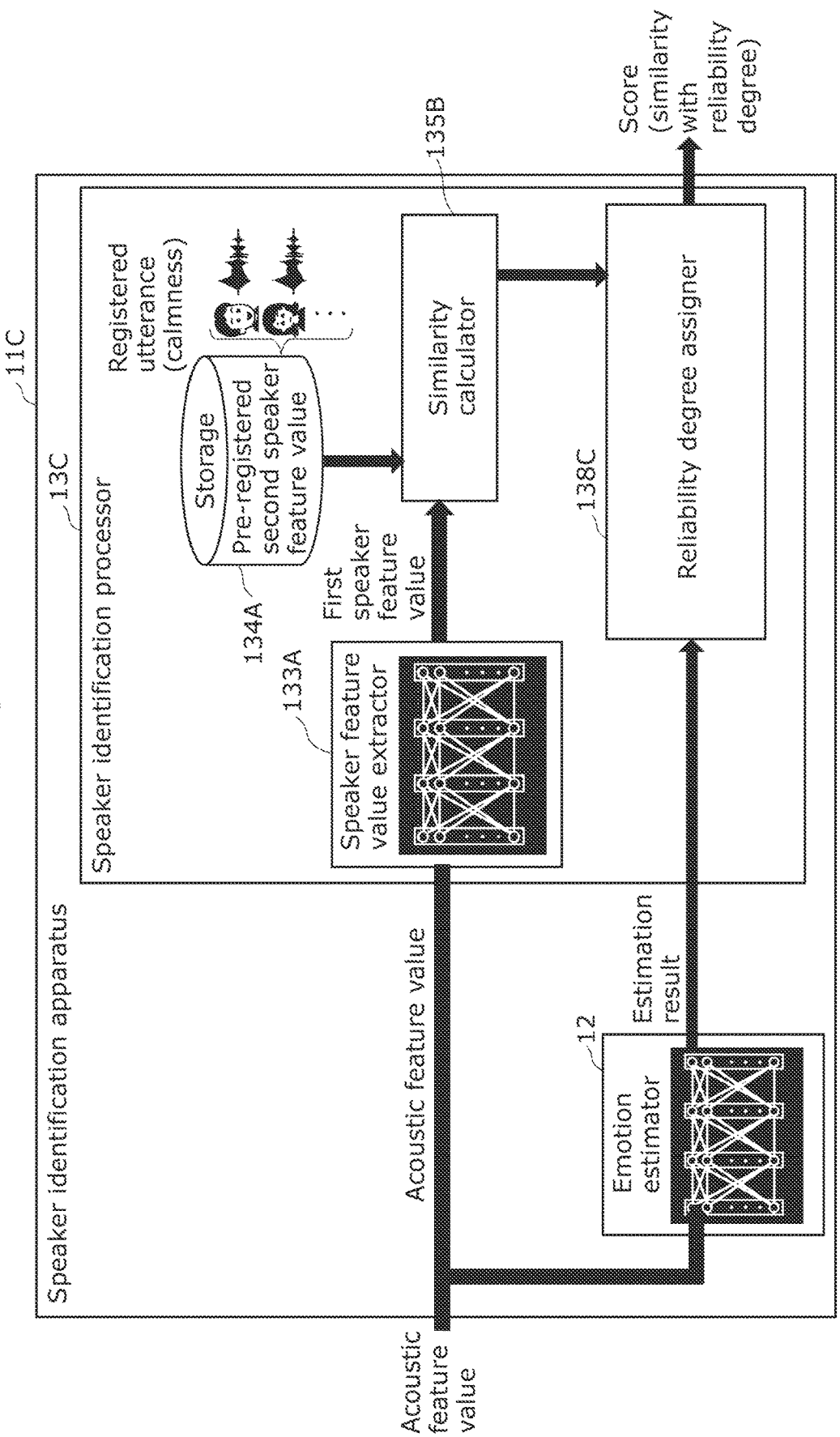
FIG. 12 is a block diagram illustrating an example of the detailed structure of a speaker identification apparatus according to Variation 3 of the exemplary embodiment.

FIG. 12 is a block diagram illustrating an example of the detailed structure of speaker identification apparatus 11C according to Variation 3 of the exemplary embodiment. The same elements as those in FIG. 4, FIG. 9, FIG. 10, etc. are given the same reference signs, and their detailed description is omitted.

Speaker identification apparatus 11C performs a process of identifying the speaker of utterance data indicating a voice of an utterance subjected to identification, as with speaker identification apparatus 11B. More specifically, speaker identification apparatus 11C calculates a score representing the similarity between the first speaker feature value of the evaluated utterance and the second speaker feature value of the registered utterance of each registered speaker. Speaker identification apparatus 11C then outputs a score obtained by assigning the reliability degree (or additional information representing the reliability degree) to the calculated similarity, as the identification result.

As illustrated in FIG. 12, speaker identification apparatus 11C according to this variation differs from speaker identification apparatus 11B illustrated in FIG. 10 in the structure of speaker identification processor 13C. More specifically, speaker identification apparatus 11C according to this variation differs from speaker identification apparatus 11B illustrated in FIG. 10 in that it includes reliability degree assigner 138C instead of reliability assigner 138B.

[8.1 Reliability Degree Assigner 138C]

Reliability degree assigner 138C assigns, to the similarity calculated by similarity calculator 135B, a reliability degree according to the emotion indicated by the estimation result of emotion estimator 12, and outputs the result as a score. Here, in the case where the one emotion and the emotion indicated by the estimation result match, reliability degree assigner 138C assigns the highest reliability degree to the calculated similarity.

[9. Speaker Identification Device 14]

Speaker identification device 14 identifies the speaker of the utterance data using the score output from speaker identification apparatus 11C.

In this variation, speaker identification device 14 identifies the speaker of the utterance data based on the score representing the similarity having the reliability degree assigned thereto, which is output from similarity calculator 135B. For example, speaker identification device 14 identifies the speaker of the utterance data using a score to which a reliability degree greater than or equal to a threshold is assigned. Speaker identification device 14 then outputs the identified speaker of the utterance as the identification result. By using only a score of high reliability, speaker identification device 14 can accurately identify the speaker of the utterance data corresponding to the score.

[Effects, Etc.]

As described above, in speaker identification apparatus 11C according to this variation, speaker identification processor 13C outputs the score obtained by assigning, to the calculated similarity between the evaluated utterance and the registered utterance, the additional information representing the reliability degree based on the estimation result of the emotion of the evaluated utterance. For example, when the match between the emotion contained in the evaluated utterance as indicated by the estimation result and the emotion contained in the registered utterance is greater, speaker identification processor 13C assigns additional information representing a higher reliability degree to the calculated similarity.

Thus, by using a score of high reliability, the speaker of the evaluated utterance can be identified in a state in which the emotion contained in the registered utterance and the emotion contained in the evaluated utterance are close (similar).

Speaker identification apparatus 11C according to this variation can therefore improve the speaker identification accuracy even in the case where an utterance subjected to identification contains the speaker's emotion.

The reliability of the speaker identification result may be determined with reference to the reliability degree of the score.

Other Possible Embodiments

While a speaker identification apparatus according to each of the exemplary embodiment and its variations, etc. has been described above, the present disclosure is not limited to such.

For example, each processing unit included in the speaker identification apparatus according to each of the exemplary embodiment and its variations, etc. is typically implemented by LSI which is an integrated circuit. These may each be individually implemented as one chip, or may be partly or wholly implemented on one chip.

The circuit integration technique is not limited to LSI, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

The present disclosure may be implemented as a speaker identification method executed by a speaker identification apparatus.

Each structural element in each of the exemplary embodiment and its variations, etc. may be configured in the form of an exclusive hardware product, or may be implemented by executing a software program suitable for the element. Each structural element may be implemented by means of a program executing unit, such as a CPU or a processor, reading and executing the software program recorded on a recording medium such as a hard disk or a semiconductor memory.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

The order in which the steps are performed in each flowchart is an example provided for specifically describing the presently disclosed techniques, and order other than the above may be used. Part of the steps may be performed simultaneously (in parallel) with other steps.

While a speaker identification apparatus according to one or more aspects of the present disclosure has been described above by way of the exemplary embodiment and its variations, etc., the present disclosure is not limited to such. Other modifications obtained by applying various changes conceivable by a person skilled in the art to the exemplary embodiment and its variations, etc. and any combinations of the elements in different ones out of the exemplary embodiment and its variations, etc. without departing from the scope of the present disclosure are also included in the scope of one or more aspects of the present disclosure.

INDUSTRIAL APPLICABILITY

The presently disclosed techniques can be used for a speaker identification apparatus, a speaker identification method, and a recording medium. For example, the presently disclosed techniques can be used for a speaker identification apparatus, a speaker identification method, and a recording medium for identifying the speakers of free utterances containing emotion in a conference proceedings system, a communication visualization system, and the like.

The invention claimed is:

1. A speaker identification apparatus that identifies a speaker of utterance data indicating a voice of an utterance subjected to identification, the speaker identification apparatus comprising:
   an emotion estimator that estimates, from an acoustic feature value calculated from the utterance data, an emotion contained in the voice of the utterance indicated by the utterance data, using a trained deep neural network (DNN); and
   a speaker identification processor that outputs, based on the acoustic feature value calculated from the utterance data, a score for identifying the speaker of the utterance data, using an estimation result of the emotion estimator,
   wherein the speaker identification processor calculates the score using a different method for each of emotions obtained from estimation results each of which is the estimation result.

2. The speaker identification apparatus according to claim 1,
   wherein the speaker identification processor includes:
   a plurality of speaker identifiers that each include a speaker feature value extractor and a similarity calculator, the speaker feature value extractor extracting, when receiving the acoustic feature value, a first speaker feature value that enables specification of the speaker of the voice of the utterance indicated by the utterance data from the acoustic feature value received, the similarity calculator calculating a similarity between the first speaker feature value extracted by the speaker feature value extractor and a second speaker feature value that is stored in a storage and enables specification of a voice of each of one or more registered speakers containing one emotion, the registered speaker being subjected to identification; and
   an identifier selector that selects, from the plurality of speaker identifiers, a speaker identifier in which the second speaker feature value that enables specification of the voice of the registered speaker containing one emotion corresponding to the emotion indicated by the estimation result is stored in the storage, and
   the speaker identifier selected by the identifier selector calculates the similarity and outputs the similarity as the score, when receiving the acoustic feature value calculated from the utterance data.

3. The speaker identification apparatus according to claim 1,
   wherein the speaker identification processor includes:

a speaker feature value extractor that extracts, from the acoustic feature value, a first speaker feature value that enables specification of the speaker of the voice of the utterance indicated by the utterance data;

a corrector that corrects a second speaker feature value that is stored in a storage and enables specification of a voice of each of one or more registered speakers containing one emotion, to a third speaker feature value that enables specification of a voice of the registered speaker containing one emotion corresponding to the emotion indicated by the estimation result, the registered speaker being subjected to identification; and a similarity calculator that calculates a similarity between the first speaker feature value extracted and the third speaker feature value resulting from correction by the corrector, and outputs, as the score, the similarity calculated.

4. The speaker identification apparatus according to claim 1, wherein the speaker identification processor includes:
a speaker feature value extractor that extracts, from the acoustic feature value, a first speaker feature value that enables specification of the speaker of the voice of the utterance indicated by the utterance data;

a similarity calculator that calculates a similarity between the first speaker feature value extracted and a second speaker feature value that is stored in a storage and enables specification of a voice of each of one or more registered speakers containing one emotion, the registered speaker being subjected to identification; and a reliability assigner that assigns, to the similarity calculated, a weight according to the emotion indicated by the estimation result, and outputs, as the score, the similarity having the weight assigned thereto, and the reliability assigner assigns a largest weight to the similarity calculated, when the one emotion and the emotion indicated by the estimation result match.

5. The speaker identification apparatus according to claim 4, wherein the acoustic feature value is calculated, by a preprocessor, from each of a plurality of items of utterance data obtained by dividing overall utterance data by a unit of identification in chronological order, the overall utterance data indicating a voice of an utterance of the speaker during a predetermined period, and the reliability assigner assigns, to the similarity calculated by the similarity calculator for each of the plurality of items of utterance data, the weight according to the emotion indicated by the estimation result for the item of utterance data, and outputs, as the score, the similarity having the weight assigned thereto.

6. The speaker identification apparatus according to claim 5, further comprising:

a speaker identification device that identifies the speaker of the overall utterance data using an overall score, the overall score being an arithmetic mean of respective scores for the plurality of items of utterance data output from the reliability assigner, wherein the speaker identification device identifies the speaker of the overall utterance data using the overall score that is greater than or equal to a threshold.

7. The speaker identification apparatus according to claim 1, wherein the speaker identification processor includes:
a speaker feature value extractor that extracts, from the acoustic feature value, a first speaker feature value that enables specification of the speaker of the voice of the utterance indicated by the utterance data;

a similarity calculator that calculates a similarity between the first speaker feature value extracted and a second speaker feature value that is stored in a storage and enables specification of a voice of each of one or more registered speakers containing one emotion, the registered speaker being subjected to identification; and a reliability degree assigner that assigns, to the similarity calculated, a reliability degree according to the emotion indicated by the estimation result, and outputs, as the score, the similarity having the reliability degree assigned thereto.

8. The speaker identification apparatus according to claim 7, further comprising:

a speaker identification device that identifies the speaker of the utterance data using the score to which the reliability degree greater than or equal to a threshold is assigned.

9. The speaker identification apparatus according to claim 2, wherein the speaker feature value extractor extracts the first speaker feature value from the acoustic feature value using a trained DNN.

10. A speaker identification method of identifying a speaker of utterance data indicating a voice of an utterance subjected to identification, the speaker identification method comprising:

estimating, from an acoustic feature value calculated from the utterance data, an emotion contained in the voice of the utterance indicated by the utterance data, using a trained deep neural network (DNN); and outputting, based on the acoustic feature value calculated from the utterance data, a score for identifying the speaker of the utterance data, using an estimation result in the estimating, wherein the score is calculated using a different method for each of emotions obtained from estimation results each of which is the estimation result.

11. A non-transitory computer-readable recording medium having recorded thereon a computer program for causing a computer to execute:

estimating, from an acoustic feature value calculated from the utterance data, an emotion contained in the voice of the utterance indicated by the utterance data, using a trained deep neural network (DNN); and outputting, based on the acoustic feature value calculated from the utterance data, a score for identifying the speaker of the utterance data, using an estimation result in the estimating, wherein the score is calculated using a different method for each of emotions obtained from estimation results each of which is the estimation result.

* * * * *